: 3,756,841
Patented Sept. 4, 1973

3,756,841
CHLORIDE TiO₂ PIGMENTS SUITED FOR HIGH SOLIDS, LOW VISCOSITY SLURRIES
Thomas J. Beliveau, Claymont, Del., assignor to E. I. du Pont de Nemours and Company, Wilmington, Del.
No Drawing. Filed June 30, 1971, Ser. No. 158,513
Int. Cl. C09c 1/36
U.S. Cl. 106—300    10 Claims

ABSTRACT OF THE DISCLOSURE

Chloride $TiO_2$ pigments are given a treatment to render them suitable for preparation of high solids, low viscosity aqueous slurries, i.e., so that they are suitable for the papermaking industry. The treatment involves calcination of the chloride $TiO_2$ particles in the presence of particular quantities of alkali metal and phosphorus followed by dry milling with an amine dispersing agent.

BACKGROUND OF THE INVENTION

It is a requirement of $TiO_2$ pigments intended for use in the papermaking industry that they be dispersible to yield highly concentrated aqueous-based slurries of satisfactory rheological characteristics; that is, be processable into slurries which at 60 to 80% solids are still of sufficiently low viscosity as to be pumpable. In the case of the so-called "sulfate" pigments, i.e. those resulting from hydrolysis of titanium sulfate solutions, such dispersibility has been achieved in economical fashion by finishing treatments in which the calcined $TiO_2$ is dry milled with dispersant, e.g. an amine dispersant, as per Allen et al., U.S. Patent 3,536,510. Efforts to utilize, however, a similar dry finishing technique with so-called "chloride" $TiO_2$ pigments, i.e. those resulting from the vapor phase oxidation of $TiCl_4$, have heretofore resulted in pigments that in slurry form gave, by comparison, inferior rheological characteristics.

SUMMARY OF THE INVENTION

In accordance with the invention, chloride $TiO_2$ pigments are finished in such a way as to provide the needed rheological characteristics when converted into high solids aqueous slurries. It is significant that these characteristics, which are comparable to those heretofore achieved only in the case of sulfate $TiO_2$ pigments, are provided without the introduction of processing steps beyond those customarily used to finish chloride pigments.

More specifically it has been found in accordance with the invention that dry milling of chloride $TiO_2$ pigment with an amine dispersing agent is effective to produce a product of satisfactory slurry-forming characteristics if the $TiO_2$ resulting from the oxidation has been given a calcination treatment at a temperature of 500° C. to 1050° C. while containing therein 0.05 to 1% by weight, based on $TiO_2$, of alkali metal and 0.05 to 3% by weight of phosphorus (as $P_2O_5$), based on $TiO_2$. As chloride $TiO_2$ pigments are typically subjected to a calcination treatment to remove chlorine, and then milled, to eliminate grit, it will be seen that the invention does not require the utilization of added costly processing steps.

Both anatase and rutile crystalline forms of chloride $TiO_2$, as well as mixture thereof, may be processed in accordance with the invention. It is, of course, well known to effect variations in the vapor phase oxidation of $TiCl_4$ so as to obtain a product in which the desired crystalline form predominates, e.g. see Frey, U.S. Patent 2,980,509. Thus volatile silicon compounds such as silicon tetrachloride may be co-oxidized and these will tend to yield products in which anatase predominates. On the other hand, volatile aluminum compounds such as aluminum trichloride may be used as agents to be co-oxidized and these will generally result in rutile formation. It will be understood that the products of the $TiCl_4$ oxidation are frequently mixtures of both crystalline forms. The co-oxidation of volatile, acid-forming phosphorus compounds, such as phosphorus trichloride, to produce anatase $TiO_2$ is also known from Krchma et al., U.S. Patent 2,462,978, and in this case the resulting phosphate will serve, in whole or in part depending upon the amount so produced, to supply the phosphorus that would otherwise need to be added prior to the subsequent calcination.

It will be noted that the invention relates solely to the treatment of $TiO_2$ particles which, because they originate from the chloride process, have their crystallinity fully developed. The particles are thus already in a non-hydrous form at the time of calcination. Prior art procedures in the field of sulfate $TiO_2$ technology are thus quite different for in those procedures the function of the calcination is to effect crystallization of hydrous particles in a desired manner.

The predominately rutile or anatase $TiO_2$ resulting from oxidation of $TiCl_4$ is then, in accordance with the invention, given a calcination treatment after it has been provided, as necessary, with alkali metal and phosphorus in the requisite amounts. Calcination temperatures of 500° C. to 1050° C. are used but in general it is desired that the temperature be sufficiently high to achieve satisfactory rheological properties but at the same time not so excessively high as to adversely affect the color or grit content of the resultant pigment. The duration of the calcination can vary, usually at least 30 minutes is required. Temperatures in the range of 600° C. to 950° C. for 2 to 10 hours are particularly preferred, and this is especially the case when using potassium as the alkali metal.

The alkali metal is conveniently provided in the form of an alkali metal salt, among which the sulfates, chlorides, hydroxides, carbonates and sulfites are preferred. While sodium, potassium and lithium are the preferred types of alkali metal to be used in accordance with the invention, other metals of the alkali group such as rubidium and cesium are satisfactory but because of their greater cost are not particularly advantageous.

Specific examples of alkali metal salts that may be utilized in accordance with the invention to pretreat the $TiO_2$ particles before calcination are sodium chloride, potassium chloride, potassium hydroxide, lithium chloride, sodium phosphate, potassium pyrophosphate, etc. It will be understood that when the anion is a phosphate or another phosphorus containing anion, then this will suffice to provide the phosphorus content also require during calcination.

If it is desired that the final pigment be in the anatase form, then advantageously the vapor phase oxidation of titanium tetrachloride will first be effected in the presence of a rutile inhibitor such as silicon tetrachloride and this will then be followed by calcination using a potassium or sodium salt as the choice for supplying the alkali metal. Thus it has been found that potassium and sodium, unlike lithium, do not tend to convert the anatase particles to the rutile form during the calcination step. If the initially produced $TiO_2$ particles are in the rutile form, then they will tend to remain in that form upon calcination irrespective of the choice of alkali metal employed.

The quantity of alkali metal employed should be in the range of 0.05 to 1% by weight, based on the $TiO_2$. When it is potassium, amounts in the range of 0.1 to 0.35% appear to provide pigments which in slurry form exhibit the most satisfactory rheological characteristics. With other alkali metals, however, operation throughout the entire range of 0.05 to 1% can be carried out with little change in result.

In addition to the alkali metal which is needed during the calcination step, it is also essential to have present from 0.05 to 3%, preferably 0.1 to 0.5%, by weight of phosphorus (calculated as $P_2O_5$) based on the weight of the $TiO_2$. As above described the phosphorus may be provided by effecting the vapor phase oxidation of $TiCl_4$ in the presence of a phosphorus additive such as phosphorus trichloride. Alternatively the phosphorus may be utilized in the form of an alkali metal phosphorus compound, e.g. an alkali metal phosphate, as above described. Otherwise it is convenient to add the phosphorus as a phosphorus compound of another metal salt or as an acid, e.g. orthophosphoric acid, pyrophosphoric acid, or metaphosphoric acid.

The alkali metal and phosphorous are advantageously applied to the chloride $TiO_2$ pigment by admixing the pigment in water with the additives followed by drying and then calcining the pigment. It is only necessary that the method employed serve to uniformly distribute the alkali metal and phosphorus in the pigment. In some cases it may be advantageous to first neutralize the pigment, e.g. with ammonium hydroxide, to facilitate removal, during calcination, of residual chlorine remaining from the $TiCl_4$ oxidation.

The type of milling device to be used in dry finishing of the calcined pigment is not critical to the invention. A common dry milling device is the fluid energy type mill or micronizer as described, for example, in Chemical Engineering Progress, vol. 55, January 1959, pages 108–110, and also in U.S. Pat. 2,032,827. Other dry milling methods such as milling with a ring roll mill can be used.

When using a micronizer, as is preferred, it may be advantageous to increase the fluid energy input of micronizing as disclosed in U.S. Pat. 3,178,121. Thus micronizer energy can be increased by increasing the steam flow or decreasing the pigment feed rate, both of which are equivalent to increasing the S/P ratio (pounds of steam per pounds of pigment). As applied to the instant invention the treatment of the calcined pigment in a fluid energy mill is advantageously effected at a controlled energy level in the range of 0.5:1 to 4:1 ratio of steam to pigment by weight.

A wide range of amine dispersing agents has been found to be useful in practicing the invention. The amine substituent or substituents thereof may be primary, secondary or tertiary amino or quaternary ammonium radicals. While as little as 0.05% by weight based on $TiO_2$ pigment of the dispersing agent is effective, generally it is preferred to use at least 0.1%. Larger percentages may be used, but usually an amount above 1% is not economically desirable. It has been found most efficient to add the dispersing agent to the $TiO_2$ before the milling operation. Mixtures of dispersing agents may, of course, be used.

The amine dispersing agents have the advantage of good thermal stability, i.e. resistance to discoloration at high temperatures. It is in this respect that triethanolamine and trimethanolamine are particularly preferred. Other alkanolamines such as monoethanolamine, 2-amino-2-methyl-1-propanol, tripropanolamine and tributanolamine and mixtures of such amines are also useful, particularly those having molecular weight from about 107 to about 233. Commercial triethanolamine, which contains 80–85% by weight of triethanolamine, about 15% of diethanolamine, and 1.0 to 2.5% by weight of monoethanolamine can be used to advantage.

Other dispersing agents that may be used in accordance with the invention are triethylamine, ethylene diamine, and triethanolamine titanium chelate ("Tyzor TE," sold by E. I. du Pont de Nemours and Co.).

The pigments of the invention are, as above described, particularly advantageous in the paper industry because of the ease to which they can be dispersed in water to produce high solids slurries. It is significant that these can be obtained using regular hard water supplies, i.e. it is unnecessary to deionize the water. But the pigments are, of course, also useful in other applications, e.g. latex paints, inks, and the like, where water dispersibility is a factor.

The following examples will serve to further illustrate the invention. Parts and percentages therein are by weight unless otherwise stated. Moreover the percentages are expressed in relation to the pigment which is treated or otherwise involved.

In the examples which follow, the pigment rheological properties are measured as follows:

A sample of the pigment is uniformly dispersed in hard water (500 p.p.m. hardness expressed as $CaCO_3$) with the aid of a conventional mixer to produce a slurry of 70% by weight total ($TiO_2$) solids. Using the Hercules Hi Shear Viscometer, a type of viscometer which has a shaft turning in a cup that holds the slurry, a rheogram or graph is produced by plotting shear rate (r.p.m.) versus shear stress (torque-dyne cm.). The rheology data given are the values of shear stress in dyne cm.$\times 10^5$ (using A-Bob) at the maximum shear rate (10 r.p.m.). In general, values below 7.0 are considered essential, below 5.0 is good, and anything below 2.0 is considered outstanding.

EXAMPLE I $TiCl_4$ was oxidized with oxygen in the vapor phase using a tubular foraminous wall reactor of the type disclosed in Kruse U.S. Patent 3,203,763 to produce a predominately anatase pigment. $SiCl_4$ was added to the $TiCl_4$ prior to injection into the reactor at a rate sufficient to give a 1% SiO in the resultant product. Chlorine gas, as a coolant, was constantly passed through the foraminous wall and into the reactor. The product stream leaving the reactor was quenched with chlorine, cooled in water cooled flues, and wet collected in water to give a slurry in excess of 600 grams $TiO_2$/liter. The pigment, averaging about 65% anatase, was given a calcination treatment in a commercial gas fired, rotary kiln after incorporating in the slurry 0.125% $K^+$ (added as 45% KOH solution) and 0.350% $P_2O_5$ (added as 75% $H_3PO_4$ solution). While calcination conditions were varied slightly over a lengthy operating run, they generally consisted of the following: a 2–4 hour drying period where water was evaporated at pigment temperatures of about 100° C., an intermediate heat-up period of 2–4 hours duration, then a final calcining treatment where the pigment was held at high temperatures (normally exceeding 700° C., with a 100 to 200° C. temperature gradient across the calcining zone) for 3–5 hours. The calcined pigment was micronized with about 0.20% triethanolamine in a micronizer mill of the type described in U.S. Patent 2,032,827 using a S/P (steam/pigment) ratio of 1.8. Representative analyses from the run show:

| Calcination zone conditions | Rheology |
| --- | --- |
| 750–950° C. for 3–5 hours | 2.0 |
| 700–850° C. for 3–5 hours | 1.0–2.4 |

EXAMPLE II

In the manner generally described in Example I, $TiCl_4$ was oxidized along with $SiCl_4$ to produce a predominately anatase pigment (68% anatase) containing 1% $SiO_2$. Calcination of various portions was then conducted at 950° C. for 3 hours after incorporation, as in Example I, of the additives specified below. This was followed by micronizing with triethanolamine (TEA), also as in Example I:

| Sample | Precalcination additives | Percent TEA | Rheology |
| --- | --- | --- | --- |
| A | None | 0.25 | (1) |
| B | 0.28% $P_2O_5$ (added as $H_3PO_4$) / 0.15% $K^+$ (added as KOH) | 0.25 | 5.5 |
| C | 0.28% $P_2O_5$ (added as $H_3PO_4$) / 0.15% $K^+$ (added as KOH) | 0.50 | 2.0 |

[1] Too viscous to measure.

EXAMPLE III

Again using the general procedure of Example I, TiCl$_4$ was oxidized along with SiCl$_4$ to produce a predominately anatase pigment (70% anatase) containing 1% SiO$_2$. The pigment was neutralized to between 8.4–8.9 by addition of dilute ammonium hydroxide and portions of the pigment were then calcined with different additives, as described below, following their incorporation in the manner described in Example I. The calcination was followed by micronizing with triethanolamine in the manner described in Example I and under the conditions given below:

| Sample | Precalcination additives, percent K+ | Precalcination additives, percent P$_2$O$_5$ | Calcination temperature | Percent TEA | Grind rate S/P | Rheology |
|---|---|---|---|---|---|---|
| A | 0.05 | 0.2 | 850 | 0.4 | 2.9 | 5.4 |
| B | 0.15 | 0.2 | 1,000 | 0.4 | 2.8 | 4.4 |
| C | 0.10 | 0.3 | 1,000 | 0.4 | 2.9 | 2.3 |
| D | 0.10 | 0.3 | 950 | 0.6 | 2.85 | 1.0 |
| E | 0.10 | 0.3 | 950 | 0.4 | 3.75 | 1.2 |
| F | 0.15 | 0.4 | 1,000 | 0.4 | 2.8 | 4.1 |

In each case the percent of anatase was essentially the same in the final product as it was before calcination and dry milling had taken place.

EXAMPLE IV

The procedure of Example III was utilized employing the same pigment before calcination but using sodium hydroxide to supply Na+ as the alkali metal. Micronizing was effected with 0.4% triethanolamine at a S/P grind ratio of 2.8.

| Sample | Precalcination additives, percent Na- | Precalcination additives, percent P$_2$O$_5$ | Calcination temperature | Percent rutile in product | Rheology |
|---|---|---|---|---|---|
| A | 0.05 | 0.3 | 850 | 29 | 1.0 |
| B | 0.05 | 0.3 | 925 | 28 | 1.2 |
| C | 0.05 | 0.3 | 1,000 | 32 | 1.4 |
| D | 0.10 | 0.2 | 850 | 31 | 1.0 |
| E | 0.15 | 0.3 | 925 | 32 | 1.0 |

EXAMPLE V

The procedure of Example III was utilized employing the same pigment before calcination but using lithium hydroxide to supply Li+ as the alkali metal. Micronizing was effected with 0.4% triethanolamine at a S/P grind rate of 2.8.

| Sample | Precalcination additives, percent Li+ | Precalcination additives, percent P$_2$O$_5$ | Calcination temperature | Percent rutile in product | Rheology |
|---|---|---|---|---|---|
| A | 0.05 | 0.2 | 850 | 30 | 1.5 |
| B | 0.10 | 0.3 | 850 | 30 | 0.9 |
| C | 0.10 | 0.3 | 925 | 50 | 0.6 |
| D | 0.10 | 0.3 | 1,000 | 87 | 0.7 |
| E | 0.15 | 0.4 | 1,000 | 100 | 0.6 |

EXAMPLE VI

The TiCl$_4$ oxidation procedure of Example I was utilized to produce a base pigment containing in excess of 99% rutile TiO$_2$. In this case the SiCl$_4$ was omitted and a quantity of AlCl$_3$ was added to the TiCl$_4$ stream at a rate sufficient to give 1% Al$_2$O$_3$ in the resultant product. In addition, approximately 10 p.p.m. of KCl was also charged to the reactor in accordance with Lewis et al., U.S. Patent 3,208,866, to aid in the control of particle size. The pigment, after wet collection as in Example I, was then treated as follows:

(A) As a control, one portion was calcined at a temperature of 500–600° C. in a commercial kiln for about 3–5 hours, and then micronized with 0.25% TEA at a 2.5 S/P ratio. Rheology could not be measured since at 70% slurry could not be formed from the pigment in the standard 500 p.p.m. hardness water.

(B) A second portion of the wet collected pigment was treated with 0.125% K+ and 0.4% P$_2$O$_5$ followed by drying and calcination at 900° C. for 3 hours as in Example I. After micronizing with TEA under identical conditions to those utilized in Part (A) of this example, it was found to have a rheology of 3.3.

EXAMPLE VII

Using the anatase pigment and procedure of Example III, 0.15% K+ and 0.35% P$_2$O$_5$ were added to the pigment followed by calcination at 700° C. for 1 hour. Different dispersing agents were added to various portions, followed by micronizing at a S/P ratio of 2.8. The following results were obtained:

| Identity of dispersing agent | Percent dispersing agent | Rheology |
|---|---|---|
| Monoethanolamine | 0.4 | 1.0 |
| 2-amino-2-methyl-1-propanol | 0.4 | 0.9 |

What is claimed is:

1. A method for finishing titanium dioxide obtained from the vapor phase oxidation of titanium tetrachloride to render said titanium dioxide dispersible in water to form high solids low viscosity slurries, the method comprising subjecting said titanium dioxide to calcination at a temperature of 500° C. to 1050° C. for a period of at least ½ hour while said titanium dioxide contains 0.05 to 1% by weight of alkali metal, based on the titanium dioxide, and 0.05 to 3% by weight of phosphorus (calculated as P$_2$O$_5$), based on titanium dioxide, and thereafter subjecting the calcined titanium dioxide to dry milling in the presence of at least 0.05% by weight of an amine dispersing agent.

2. Method according to claim 1 wherein the titanium dioxide subjected to calcination is predominately anatase titanium dioxide.

3. Method according to claim 1 wherein the titanium dioxide subjected to calcination is predominately rutile titanium dioxide.

4. Method according to claim 1 wherein the alkali metal is selected from the group consisting of potassium and sodium.

5. Method according to claim 1 wherein the amount of alkali metal is in the range of 0.1 to 0.35 by weight based on the titanium dioxide and the amount of phosphorus (calculated as P$_2$O$_5$) is 0.1 to 0.5% by weight based on titanium dioxide.

6. Method according to claim 1 wherein the dispersing agent is an alkanolamine.

7. Method according to claim 6 wherein the dispersing agent is monoethanolamine.

8. Method according to claim 6 wherein the dispersing agent is triethanolamine.

9. Method according to claim 6 wherein the dispersing agent is 2-amino-2-methyl-1-propanol.

10. Method according to claim 1 wherein the dry milling is effected by micronizing in a fluid energy mill with steam, using a 0.5:1 to 4:1 ratio of steam to pigment, by weight.

References Cited
UNITED STATES PATENTS

| | | | |
|---|---|---|---|
| 2,150,235 | 3/1939 | McKinney | 106—300 |
| 3,169,074 | 2/1965 | Holbein | 106—300 |
| 3,615,204 | 10/1971 | Libera | 106—300 |
| 3,412,944 | 11/1968 | Wollenberg | 106—300 |
| 3,536,510 | 10/1970 | Allen et al. | 106—300 |
| 2,737,460 | 3/1956 | Werner | 106—300 |

JAMES E. POER, Primary Examiner

U.S. Cl. X.R.

106—308 N